Jan. 26, 1971 K. L. SHELTER 3,557,623
DEVICES HAVING FLEXURES OF ALUMINUM MATERIAL
Filed Oct. 8, 1968
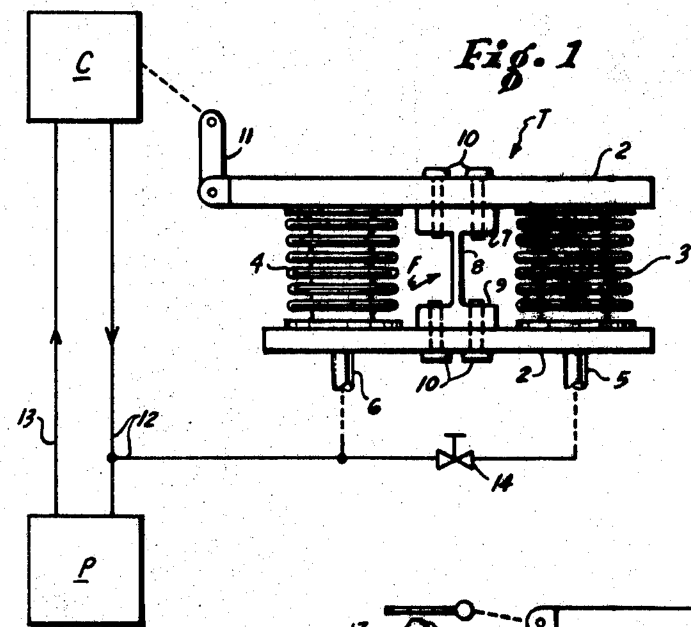
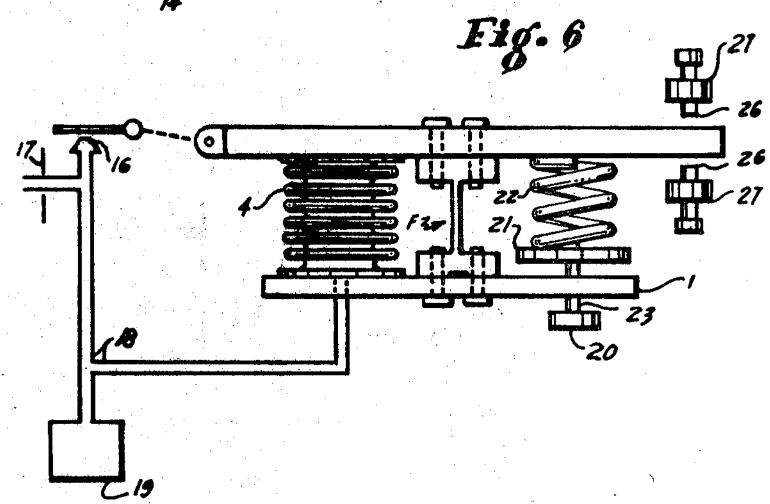
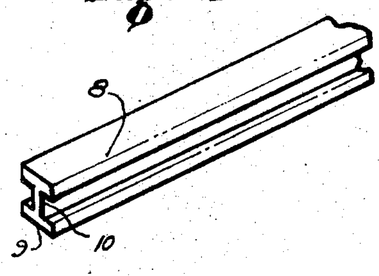
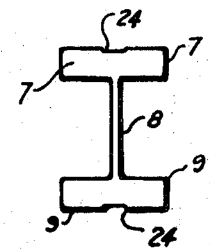
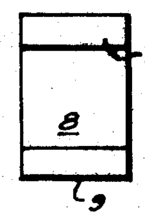
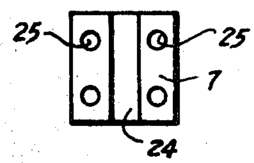

3,557,623

DEVICES HAVING FLEXURES OF ALUMINUM MATERIAL

Kenneth L. Shelter, Chili, N.Y., assignor to Sybron Corporation, a corporation of New York Filed Oct. 8, 1968, Ser. No. 765,887
Int. Cl. G01l 7/06
U.S. Cl. 73—410 7 Claims

ABSTRACT OF THE DISCLOSURE

A rigid beam is fixed to a rigid base by a flexure for deflection by bellows connected between the beam and base. The flexure is an I-section extruded from 6061–T6 aluminum alloy stock.

This invention relates to transducers of the type wherein a rigid beam is deflected by condition responsive means about an axis defined by a flexure. Transducers of this sort are of universal occurrence, especially in the instrumentation field as basic elements of measuring and control apparatus. The arrangement is that the condition provides beam deflecting force, and the material of the flexure is chosen for good and stable elastic properties, in order that the beam deflection be a precise and reliable measure of the magnitude of the condition, and remain so indefinitely despite cyclical variation of the condition.

A common example is a rigid beam mounted by a relatively stiff cantilever flexure to a rigid base, with bellows or the like applying deflecting force to the beam in response to pneumatic pressure. According to the prior art, the flexure is made of conventional spring material; such as steel. Such flexures are critical as to design and fabrication. According to my invention, I use aluminum for the flexure material. Heretofore, aluminum has not been considered suitable for flexure use, but I have found it to be as satisfactory as steel, and much easier and more economical to fabricate.

My invention finds particular application to follow-up units in penumatic control service. Such a unit is provided by a transducer of the type referred to, and the condition providing beam-deflecting force is pneumatic pressure.

FIG. 1 shows a transducer according to the invention as used in pneumatic process control.

FIGS. 2 through 5 illustrate the flexure according to the invention, FIG. 2 being a perspective view relating to a fabricating stage, and the FIGS. 3, 4 and 5 being conventional plan and elevation views of the flexure per se.

FIG. 6 shows a transducer according to the invention as used in pressure regulation.

In FIG. 1, a transducer T according to the invention includes a rigid base 1, a rigid beam 2, bellows 3 and 4. The bellows have respective pressure connections 5 and 6 for permitting air under pressure to flow into or out of the bellows interiors. A flexure F, an I-section consisting of an upper flange 7, a web 8 and a lower flange 9, has its said flanges secured rigidly to base 1 and beam 2 by suitable means such as machine screws 10. As will be seen from FIGS. 2 through 5, in FIG. 1, flexure F is shown as oriented for deflection in the plane of FIG. 1 with web 8 bending in cantilever style in the same plane.

As thus far described, transducer T may be supposed to be the usual differential arrangement wherein the moments about an axis normal to the plane of the figure and defined by web 8 are balanced so long as the pressures within the bellows are equal the bellows exteriors being assumed to be subject to the same pressure. That is to say, as if the effective areas, stiffness and effective lever arms of the bellows are equal, and as if the flexure's resistance to deformation from its unstressed state does not depend on whether it bends clockwise or counterclockwise. In practice, the flexure does very closely fill this last requirement, but ordinarly adjustment of lever arm length is provided since one or another of the other requirements is normally not exactly fulfilled.

In a typical transducer T, the pressures within the bellows will vary over the usual pneumatic instrumentation range of 3–15 pounds per square inch gauge, and from this variation up to 0.37 radian deflection of the beam 2 is desired, with the bellows acting on effective lever arms on the order of an inch or so, most of the resistance to bending usually being due to the flexure F and such pressure as may exist in the bellows. Supplemental springs may be provided, however. The output of the transducer is vertical motion of a feedback link 11, in any event.

The transducer T shown is of the type used in proportional plus reset control as a follow-up unit. The control pressure in this sort of control tends to cycle during a deviation from the control point. Thus, calling the box C a controller (transducer T is really part of it, though separately shown), the control pressure is applied to the process P as well as to the transducer T via piping 12, and the controller in effect measures deviation from the control point via piping 13 or equivalent. The pressure in line 12 and in bellows 3 and 4 remains steady as long as there is no deviation. A deviation, however, causes the controller to change the control pressure in piping 12. In response, a difference in the pressures in bellows 3 and 4 arises since an adjustable restrictor 14 in piping 12 makes the pressure in bellows 3 change more slowly than in bellows 4. Consequently, the beam deflects from the position shown. The resultant motion of link 11, however, is arranged to make the controller reverse the change in control pressure. This effect does not last, since the equalizing pressure in the bellows starts the beam back to its original position. As long as the original deviation lasts, this sequence of events repeats. This is characteristic of proportional plus reset control and, indeed, the restrictor 14 is often calibrated in "repeats per minute," since the repetition rate is inversely proportional to the delay in equalization caused by the restrictor 14. Consequently, the flexure F must be made of a material able to undergo up to millions of deflections of the beam 2, without failing due to fatigue. In the case of steel and other conventional spring materials, the art of design and manufacture for such condition is highly developed. However, the prior art appears to have considered aluminum unsuitable due to the fact no doubt that its fatigue-resistance in the face of repeated deformation is, generally speaking, poor.

Nevertheless, I have discovered that the flexure F can be made of a high-yield strength extrudable aluminum such as magnesium silicide wrought aluminum alloy, solution heat-treated and artificially aged. This is an extrudable material routinely available commercially under the aluminum industry specification 6061–T6. To manufacture the flexure, a die is constructed and bar stock is extruded thereby in the I-beam shape illustrated in FIG. 2 in perspective. The fabrication process is completed by simply sawing the I-beam into right angle sections such as are illustrated in FIGS. 3, 4 and 5 and drilling suitable holes 25 in the flanges 7 and 9 of the I-sections forming the flexures. The grooves 24 assure that the clamping stresses are located at the screws 10 even if the clamped surfaces are somewhat irregular.

FIGS. 3, 4 and 5 are for the most part self-explanatory. It is to be noted, however, that the shape and dimensions shown are substantially exactly those of a full-size flexure as actually manufactured, and that FIG. 3 illustrates the cross-section of the stock as it comes from the die (not shown), and before cutting it up into flexures.

Insofar as fabrication is concerned, aluminum is preferable to steel and the like. With aluminum, die life is so long as not to be worth the trouble of estimating. That is to say, the flexure, it seems, can be mass-produced to given tolerances for years without the die wearing enough to affect these tolerances.

Steel flexures, on the other hand, would be produced by machining, and positive control of tolerances would be required at all times. Furthermore, tolerances are narrower with steel. In a typical real transducer T, the web width of a steel flexure might be 0.040 inch for a given spring rate. To meet the spring rate requirement as closely as desirable, requires that tolerances be held to something less than ±0.001 inch in web thickness. In an equivalent aluminum flexure, web thickness would be about 50% larger, and the allowable tolerance in that would be greater than 0.001 inch, and besides, is automatically taken care of once and for all by the die.

Otherwise, the aluminum flexure is functionally the equal of a steel counterpart. Since the former is easier and more economical to fabricate than the latter, it is therefore distinctly superior, on the whole, to the steel flexure.

The illustrated flexure is designed for a transducer T having a beam length of nominally two inches between the center lines of the bellows, wherein each bellows has a nominal effective area of 0.59 inch and a spring rate of 10.3 pounds/inch, and wherein the difference between the pressures in the bellows can be as high as almost 20 p.s.i., depending on supply pressure. Under these conditions, the flexure as shown, and made of the aluminum alloy specified above, can be expected to have a service life as long as that of the controller it forms part of. This is predicated upon life tests of the transducer T, involving applying millions of cycles of bellows pressure (one bellows omitted or open to the atmosphere) from 0 to 20 p.s.i.g. and back. The flexure as shown has a spring rate of about 280 lbs./in., and therefore provides the main elastic resistance to beam deflection. The specified material is not the only possibility. Another material, aluminum industry specification 6061–T4, is marginally adequate, due to the fact that its yield strength is about half the 37,000 lbs. yield strength of the 6061–T6 alloy. For the purposes of the present invention, the yield strength of 6061–T4 represents substantially the lower bound of the range of what would be considered high-yield strength for aluminum materials within the scope of the claims annexed hereto. Actually, they are the same materials, it appears, except that 6061–T4 is not artificially-aged. In any event, this last material fails the above-described test by fatigue after a few hundred-thousand pressure cycles. What is meant by fatigue failure is that the web 8 of the flexure develops a permanent deformation or set. This means that if the beam 2 deflects clockwise from the position shown (supposing bellows pressures to be equal therein) under a given difference between the bellows pressures, and then pressures are equalized again, the beam does not deflect all the way back to the position shown.

The illustrated use of the transducer T is not the only possible one. FIG. 6, for example, shows it as a simple pressure regulator. Here, the beam 2 deflects a baffle 15 toward and away from a nozzle 16 supplied with the usual instrument air at, say, 20 p.s.i.g. through a restriction 17. This air is also fed by piping 18 to a closed space 19 and to the interior of bellows 4. As is known, air discharges out of the nozzle and if the baffle is 0.050 inch spaced from the nozzle, or less, the back pressure in piping 18, space 19, and bellows 4, will be in inverse proportion to the spacing between baffle and nozzle. The bellows 3 is replaced by a knob 20, spring seat 21 and compression spring 22, which provides for control of said spacing such as to regulate the pressure in chamber 19 to any selected value in a range from a little more than atmospheric pressure (0 p.s.i.g.) to a little less than 20 p.s.i.g. Knob 20 is used to turn a threaded shaft 23 tapped through base 1 and having spring seat 21 mounted thereon so that as the shaft 23 is turned, so as to move the spring seat 21 up, spring 22 compresses and exerts a corresponding force on beam 2. As a result, baffle-nozzle spacing decreases, the back pressure in bellows 4 increases, causing the bellows to force the baffle 15 away from the nozzle, and so on, with the kell-known end result that the pressure in chamber 19 can be set to any pressure in the above-described range by positioning the spring seat 21 at a corresponring height, as measured, say, by knob rotation.

The aluminum flexure according to the invention is useful here, of course, and in fact the conditions of use are less stringent in FIG. 1 since beam deflection is inherently limited by the pressure regulating action. That is to say, though bellows 4 may be exposed to the maximum possible pressure change (around 15 p.s.i., or so) the beam 2 never gets much chance to deflect a corresponding amount since as soon as knob 20 is turned, baffle-nozzle spacing-change causes the pressure to change so as to oppose deflection due to teh knob. If the linkage L multiples sufficiently, no visibly perceptible motion of the beam results. That is to say, the 0.050 inch change in baffle-nozzle spacing, which suffices for maximum change in the pressure in bellows 4, is caused by much less motion than 12 p.s.i. change would cause in bellows 3 as used in the controller of FIG. 1. Accordingly, in the regulator of FIG. 6, a less fatigue-resistant material than 6061–T6 would be satisfactory.

The regulating action in effect provides stops limiting deflection or motion of the beam, and in fact stops can be provided as such to more positively assure limiting, to prevent spring 22 from being compressed too far, for example. Thus, machine screws 26, tapped into supports 27 and flanking the end of beam 2 may be provided. Supports 27 may be supposed to be rigidly attached to the base 1 by any suitable means, not shown, whereby adjusting screws 26 to the appropriate heights would contain the deflections of beam 2 within desired limits.

Finally, in FIG. 1, beam deflection is limited by the reset arrangement. That is to say, equalization of pressure through the restriction 14 cuts down the deflection of the beam in response to pressure change in bellows 4, as will be obvious if one considers the effect of closing restrictor 14 completely.

It is evident from the foregoing that the subcombination of beam, base and aluminum flexure are of wide utility, the examples described being only two of many conventional uses for such subcombination. Further, the particular aluminum alloys disclosed are considered only exemplary of the possibilities of aluminum materials for use in flexures. By aluminum material, I mean aluminum metal or aluminum alloy having the characteristic ductility and lightness. Naturally, the aluminum material used must have sufficiently high yield strength to provide the fatigue resistance desired for the particular use of the flexure, taking into account whether or not there be provided stops, regulator action, and/or the like expedients for assuring appropriate limits on flexure deformation in service. It is to be observed that the combination of base, beam, bellows and flexure is useful as such, as in the operation of switches, mechanisms, and a wide variety of other devices designed to operate in response to force or relatively limited motion.

While I have described my invention in accordance with 35 USC 112, such description is not intended to be limited, and those skilled in the art will be aware of many other uses and modifications of my invention which will fall within the claims annexed thereto.

I claim:

1. In a transducer comprising a rigid beam, a rigid base, a flexure in the form of a cantilever connecting said beam and said base, and condition responsive means for deflecting said beam about an axis defined by said cantilever, the improvement wherein said flexure is made of high-yield strength, extrudable aluminum material.

2. The invention of claim 1, wherein said cantilever is an I-section having upper and lower flanges and a web, said upper flanges being rigidly secured to said beam, and said lower flanges being secured to said base.

3. The invention of claim 1, wherein said aluminum material is aluminum alloy 6061–T6.

4. In combination with the invention of claim 1, means for preventing excess deformation of said cantilever by deflection of said beam, said excess deformation being that sufficing, if large enough, to cause the yield strength of said aluminum material to be exceeded, said means effectively providing stop means for acting on said beam to prevent deflection thereof such as to cause said deformation.

5. The invention of claim 1, wherein each of the ends of said beam is connected to said base by separate elastic means for exerting forces on said ends, one said elastic means being a bellows; said bellows providing said condition responsive means for deflecting said bellows in response to fluid pressure applied to its interior.

6. The transducer of claim 5, wherein the other said elastic means is also a bellows also providing for deflecting said beam in response to fluid pressure applied to its interior, the said bellows being positioned so that each opposes deflection of said beam by the other.

7. The transducer of claim 6, wherein piping is provided for admitting fluid under pressure freely to one said bellows, and there being restricting means connecting the fluid under pressure in said piping to the interior of the other said bellows.

References Cited

UNITED STATES PATENTS

| | | | |
|---|---|---|---|
| 2,706,400 | 4/1955 | Unholtz | 73—71.6 |
| 2,816,443 | 12/1957 | Gomez et al. | 73—407 |

DONALD O. WOODIEL, Primary Examiner